US010265610B2

(12) United States Patent
Jarchafjian et al.

(10) Patent No.: US 10,265,610 B2
(45) Date of Patent: Apr. 23, 2019

(54) METHOD AND SYSTEM FOR MAGNETIC FIELD BASED INFORMATION TRANSFER

(71) Applicant: Disney Enterprises, Inc., Burbank, CA (US)

(72) Inventors: Harout Jarchafjian, Glendale, CA (US); Lanny Smoot, Thousand Oaks, CA (US); Robert Michel, La Crescenta, CA (US)

(73) Assignee: Disney Enterprises, Inc., Burbank, CA (US)

( * ) Notice: Subject to any disclaimer, the term of this patent is extended or adjusted under 35 U.S.C. 154(b) by 792 days.

(21) Appl. No.: 14/726,293

(22) Filed: May 29, 2015

(65) Prior Publication Data
US 2016/0346671 A1 Dec. 1, 2016

(51) Int. Cl.
A63F 3/00 (2006.01)
A63F 9/24 (2006.01)
H04W 4/80 (2018.01)

(52) U.S. Cl.
CPC ........... *A63F 3/00694* (2013.01); *H04W 4/80* (2018.02); *A63F 2003/00668* (2013.01); *A63F 2009/2485* (2013.01)

(58) Field of Classification Search
CPC ........ A63F 3/00694; A63F 2003/00668; A63F 2009/2485; H04W 4/80; H04W 52/383; G01R 33/07; G01R 35/005; G06F 3/014; G06F 21/64; H04B 5/0031; H04B 5/0081; G05B 19/042; G05B 2219/25313; H01L 43/00
See application file for complete search history.

(56) References Cited

U.S. PATENT DOCUMENTS

| | | | | |
|---|---|---|---|---|
| H1990 H | * | 9/2001 | Kherat et al. | 338/32 R |
| 8,421,448 B1 | * | 4/2013 | Tran | G01R 33/07 |
| | | | | 324/207.2 |
| 2006/0117183 A1 | * | 6/2006 | Hatano | G06F 21/64 |
| | | | | 713/176 |
| 2012/0220227 A1 | * | 8/2012 | Dobyns | H04B 5/0031 |
| | | | | 455/41.1 |
| 2014/0320114 A1 | * | 10/2014 | Enkovaara | G05B 19/042 |
| | | | | 324/207.11 |
| 2014/0347049 A1 | * | 11/2014 | Tsai | G01R 35/005 |
| | | | | 324/307 |

OTHER PUBLICATIONS

FM Radio UI, Pronskyi, 2014 https://dribbble.com/shots/1595875-FM-Radio-UI-IOS-7-App-design-rebound.*
Scanning rooms with an iPhone, Przemek, 2014 https://www.nomtek.com/scanning-rooms-with-an-iphone/.*

* cited by examiner

*Primary Examiner* — Jianxun Yang
(74) *Attorney, Agent, or Firm* — Dorsey & Whitney LLP

(57) ABSTRACT

Disclosed herein are various systems and methods for transmitting information using modulated magnetic fields. A system comprises a transmitter having a first magnetic field source for transmitting a first modulated magnetic field to a receiver for decoding and a field controller coupled to the first magnetic field source for controlling the first modulated magnetic field. The system can further include a receiver having a first magnetometer configured to detect the first modulated magnetic field produced by the first magnetic field source and a decoder coupled to the first magnetometer for interpreting the first modulated magnetic field.

12 Claims, 11 Drawing Sheets

METHOD AND SYSTEM FOR MAGNETIC FIELD BASED INFORMATION TRANSFER

TECHNICAL FIELD

The present disclosure relates generally to information transmission and more specifically to transmitting information by modulating magnetic fields.

BACKGROUND

The proliferation of mobile electronic devices has driven an interest in short range communication. Having the ability to efficiently and effectively transfer electronic information over short distances without invoking power consumption and/or bandwidth limits of long range cellular communication provides more effective, efficient, and convenient interaction of electronic devices. Traditional mechanisms for short range communication include near field communication (NFC) and Bluetooth® low energy (BLE). NFC employs point to point radio frequency (RF) communication over extremely short distances (e.g., less than 20 cm). However, NFC is subject to potential security restrictions and interference because it operates in a globally available and unlicensed industrial, scientific and medical (ISM) radio frequency band of 13.56 MHz. BLE also employs an ISM radio frequency for transmitting information through radio waves, and thus has similar restrictions as NFC, but BLE has a much longer range than NFC (e.g., about 100 m).

SUMMARY

According to a first embodiment, a system for transmitting information using modulated magnetic fields is disclosed. The system comprises a transmitter having a magnetic field source for transmitting a modulated magnetic field and a field controller coupled to the magnetic field source for controlling the modulation of the magnetic field. The system further includes a receiver having a magnetometer configured to detect the transmitted modulated magnetic field and a decoder coupled to the magnetometer for interpreting the modulated magnetic field and extracting information therefrom.

In another embodiment, a method for transmitting information with a magnetic field source is disclosed. The method includes receiving information to be transmitted, encoding the information, and selectively modulating a magnetic field based on the encoded information.

In yet another embodiment, a method for receiving information from a magnetic field source is disclosed. The method includes receiving a modulated magnetic field from a first magnetic field source having a known strength, determining one or more characteristics of the modulated magnetic field, determining a location of the first magnetic field source based on the determined one or more characteristics, and identifying the first magnetic field source based on the modulated magnetic field.

OVERVIEW

Figure 1:
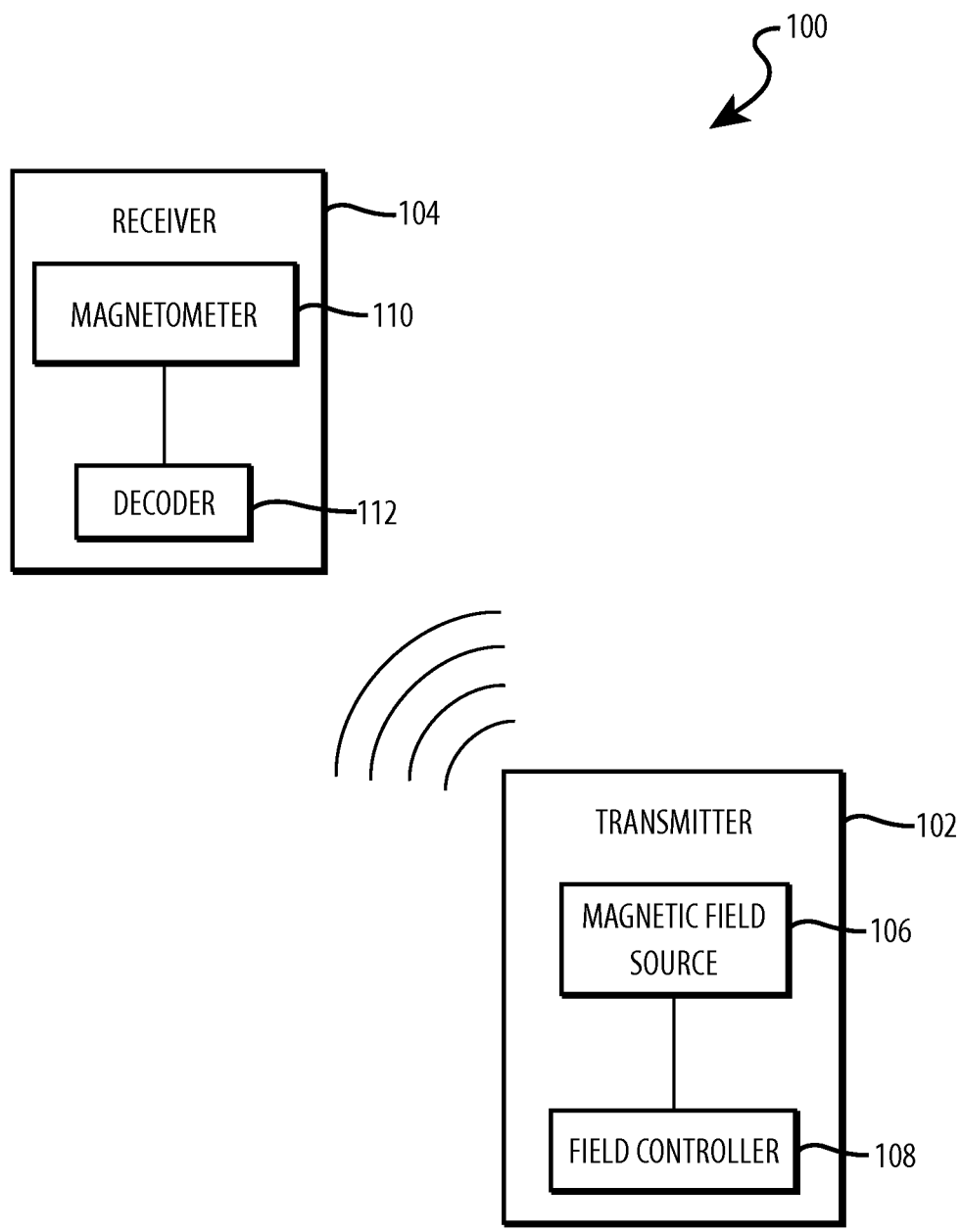
FIG. 1 is a functional block diagram of an information transmission system for transmitting information using modulated magnetic fields.

Embodiments of this disclosure recognize that BLE and NFC are limited through both technology and over-regulation such that they are be unsuitable for various uses. For example, both NFC and BLE communicate using a highly regulated portion of the radio wave spectrum. Additionally, both NFC and BLE are standardized technologies. Therefore, for devices to function properly, both the transmitters and receivers used must comply with the relevant standard. As noted above, both BLE and NFC suffer from bandwidth limitations as well. Accordingly, there is a need for a versatile short range communication mechanism that does not suffer from the shortcomings of NFC and BLE.

Disclosed herein are highly adaptable short range communication systems and methods using modulated magnetic fields to transmit information from a transmitter to a receiver. A transmitter is used to electrically or mechanically modulate a characteristic of a magnetic field, such as the strength and/or direction, in a predetermined manner to encode information onto the magnetic signal. A receiver then detects and decodes the modulated magnetic field to extract the information therefrom. Information transfer using modulated magnetic fields can be implemented in a variety of contexts to facilitate short range communication of various types of data. By using magnetic fields, rather than conventional wireless data communication methods, such as NFC and BLE, the information can be transmitted between devices without requiring transmission over a crowded spectrum, such as BLE. Additionally, BLE and NFC often require permission from a user to activate the transmitter and thus require user input in order to transmit information. On the contrary, using a system of the present disclosure, data can be transmitted without requesting permission, allowing a seamless user experience.

In one example, the transmission system is used in a theme park setting and allows characters to electronically sign a guest's device. In particular, a transmitter can be embedded in a stylus or a glove of a theme park character to produce modulated magnetic fields to produce graphics, such as signatures (i.e., a digital representation of a signature or identifying graphic), or the like. The transmitter transmits the information from the character to a corresponding receiver incorporated into user's device. The information in this example can correspond to a digital signature of the character, which allows the character to have a consistent digital signature across many different guests and different people playing the character. Currently, in some theme parks, costumes include large gloves that reduce the dexterity of the person and creating a signature can be difficult and inconsistent. By using the transmission method herein, a character can easily sign many user devices by transmitting information corresponding to a signature that is then displayed on the user's device. Specifically, the character can use a stylus or a portion of a gloved finger to "sign" across a touch sensitive screen of a guest's device and the signature information is transmitted via the transmitter and then caused to be displayed on the display of the device. In this manner, the physical motion of the character is not required to correspond to the actual signature appearance, as the displayed signature is transmitted through the system, rather than inputs via the touch screen. This allows for consistency across people playing the character and across various points in time and different guest devices. This allows a more "magical" experience for guests as the characters seem more realistic.

In another example, the transmission system can be incorporated into a board game to track the location of various playing pieces. For example, each game piece includes magnetic field sources that transmit magnetic fields to an electronic device. The electronic device using the various characteristics of the magnetic field (e.g., radial distance, angular position, strength, etc.), the electronic device can determine and track the position of the game pieces relative to itself and/or a game board. In this manner, the electronic device can act as an automatic scoreboard, mediate disputes between players, and/or compete with players. In this embodiment, the transmitters in the game pieces include electromagnets or permanent magnets that are mechanically modulated or activated to transmit magnetic field data.

DETAILED DESCRIPTION

Turning now to the figures, FIG. 1 is a functional block diagram of an information transmission system, generally designated 100, for transmitting information using modulated magnetic fields. The information transmission system 100 generally includes a transmitter 102 for encoding and sending information using modulated magnetic fields and a receiver 104 for detecting and decoding the modulated magnetic fields. The transmitter 102 includes a magnetic field source 106 and a field controller 108.

Figure 8:
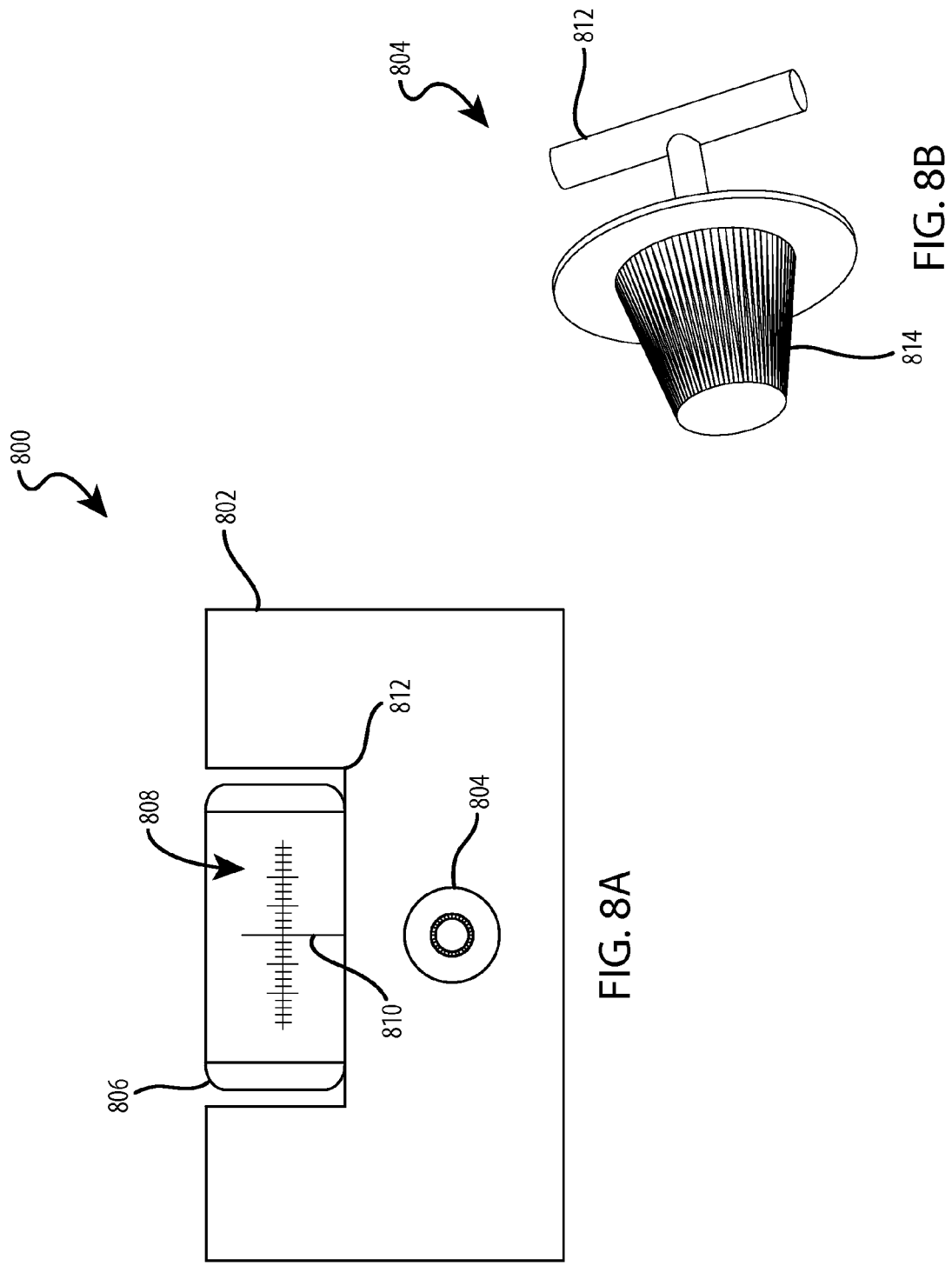
FIGS. 8A and 8B depict a fourth example of the information transfer of FIG. 1 including a mock radio receiver having a transmitting dial.

The transmitter 102 is any device capable of housing one or more magnetic field sources 106. For example, the transmitter 102 can be a portable device, such as stylus, pen, smartphone, tablet, laptop computer, desktop computer, board game token, wand, glove, videogame console controller, or any other suitable device. The form of the transmitter 102 varies based on the desired application, and can be housed in a portable module which can be connected to various carrier devices. Additional example components of the transmitter 102 are discussed in further detail below with respect to FIG. 8.

With continuing reference to FIG. 1, the magnetic field source 106 is any device, material, metal, mineral, or other substance or combination thereof capable of generating a passive or active magnetic field. In various embodiments, the magnetic field source 106 can be any of an electromagnet, a permanent magnet, a ferromagnet, or any combination thereof. In certain embodiments, the magnetic field source 106 can include two or more magnetic field sources arranged orthogonally to one another. For example, the magnetic field source 106 can include three electromagnetic coils with one oriented along the x-axis, one oriented along the y-axis, and one oriented along the z-axis of a three-dimensional Cartesian coordinate system. In yet other embodiments, the magnetic field source 106 can include at least one static magnet and one rotatable magnet for producing modulated magnetic fields. For example, in a first position, the static magnet and the rotatable magnet have their poles aligned anti-parallel, such that no net magnetic field is present (e.g., the north pole of the first magnet is adjacent to the south pole of the second magnet, so that the magnetic fields of the two magnets sum to zero). When the rotatable magnet is rotated, the poles move from the anti-parallel position and produce a net magnetic field which can be detected by a receiver. In still other embodiments, the magnetic field source 106 includes a rotatable magnet surrounded by a shunt having gaps formed therethrough at predetermined locations such that when the magnetic field source 106 rotates, a pulsed magnetic field is produced based on the gaps in the shunt.

In various embodiments, the magnetic field source 106 is configurable to different states to enable modulation. For example, when the magnetic field source 106 is a permanent magnet, it has two states: on and off, where the off state is obtained by blocking the magnetic field of the magnetic field source 106 from reaching the receiver 104 with a shunt (see FIG. 7). In embodiments where the magnetic field source 106 is implemented with electromagnets, the magnetic field source 106 has three states: off, polarity in a first direction, and polarity opposite the first direction. Additional methods of modulation are also possible, such as varying magnetic field strength by controlling current through an electromagnet. Varying the state of the magnetic field source 106 allows information to be encoded and transmitted with magnetic fields.

The field controller 108 is substantially any mechanical device, electrical device, electromechanical device, or combination thereof capable of causing the magnetic field source 106 to modulate the magnetic field. The configuration of the field controller 108 varies based on the configuration of the magnetic field source 106. Modulating, as used herein, refers to activating, deactivating, changing polarity, blocking or shunting the field, or any other change in a magnetic field capable of being detected by a magnetometer. In some embodiments, the field controller 108 includes a mechanical shunt (see FIG. 7). In other embodiments, the field controller 108 is an electrical circuit, such as a microcontroller or processing element, configured to control current through an electromagnet. In some embodiments, the field controller 108 includes a computing component capable of controlling the modulation of the magnetic field source 106. In embodiments with multiple orthogonal magnetic field sources 106, each magnetic field source 106 can have a dedicated field controller 108, or they can each be controlled by a single field controller 108.

In various embodiments, the field controller 108 converts information, such as an input stream of data or a message, into encoded information, such as Morse code, binary, ternary, or any other suitable form to allow transmission via a magnetic field. In various embodiments the field controller 108 is configurable through user input such as through a keyboard, touchpad, or audio interface. For example, a user can type a message to be transmitted into a keyboard, and the field controller 108 can convert the message into a form suitable for transmission via magnetic fields. In other embodiments, the field controller is preprogrammed to cause the magnetic field source 106 to modulate the magnetic field automatically or on command. Although depicted as directly connected in FIG. 1, those skilled in the art will appreciate that various circuit elements, such as opto-isolators and/or transistors may be positioned between the field controller 108 and the magnetic field source 106. Therefore, the connection between the field controller 108 and the magnetic field source 106 can be indirect and through one or more intermediaries. In some embodiments, the field controller 108 is internal to the transmitter 102. In other embodiments, the transmitter 102 is connected to the field controller 108 such as through a wired connection, wireless connection, or any combination thereof. For example, the transmitter 102 can be connected to the field controller 108 by a local area connection (LAN) or a wide area connection (WAN).

The receiver 104 is substantially any device capable of detecting modulated magnetic fields, such as those generated by the magnetic field source 106, and registering a change based on the detected magnetic field. The receiver 104 includes a magnetometer 110 and a decoder 112. Similar to the transmitter 102, the receiver 104 can be incorporated as part of a module that can be attached to various carrier devices. Additionally, the receiver 104 can be incorporated into a larger electronic device, such as, but not limited to, a smartphone, a personal digital assistant (PDA), a laptop computer, a desktop computer, a tablet computer, a gaming device, a wearable device, or any other suitable device.

The magnetometer 110 is generally any device capable of detecting modulated magnetic fields and providing an output signal based on the modulated magnetic fields. The magnetometer 110 can register one or both of magnitudes and/or directions of magnetic fields. As one skilled in the art will appreciate, the type and arrangement of the magnetometer 110 depends on the type and number of magnetic field sources used in transmitting the modulated magnetic fields. In certain embodiments, the magnetometer 110 includes one or more Hall Effect sensors or other micro electromechanical systems (MEMS). In other embodiments, a rotating coil magnetometer is used. In yet other embodiments, other types of magnetometers can be used, such as a fluxgate magnetometer. In various embodiments, the magnetometer 110 converts a detected modulated magnetic field into analog or digital electrical signals that can be decoded and/or interpreted to extract information.

The decoder 112 is generally any component, such as an electrical circuit, software instructions, or any combination thereof capable of decoding and/or interpreting a modulated magnetic field to extract information. The decoder 112 can be, for example, a software application executing on one or more processing elements of a smartphone. In various embodiments, the decoder 112 is coupled to and controls the magnetometer 110. For example, the decoder 112 instructs one or more orthogonal magnetometers 110 to detect modulated magnetic fields. In some embodiments, the decoder 112 is connected to a display device and cause changes in the display device based on information transmitted using modulated magnetic fields. For example, the decoder 112 can cause a digital representation of a signature to appear on a display device in response to the magnetometer 110 detecting a particular pattern of modulated magnetic fields. The configuration of the decoder 112 is variable based on the configuration and orientation of the magnetometer 110 and/or the magnetic field source 106.

Figure 2:
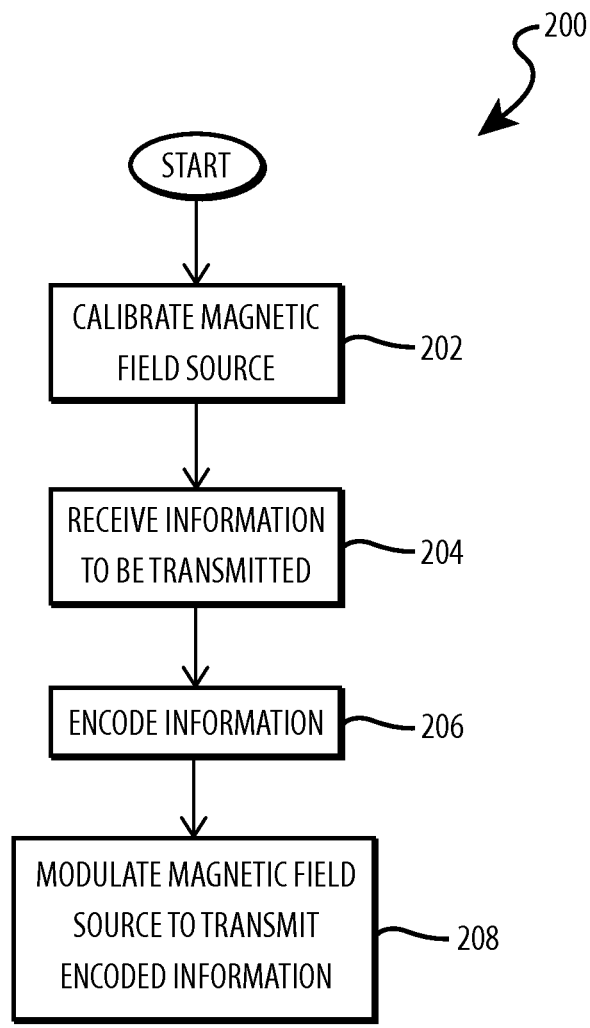
FIG. 2 is a flowchart illustrating a method for transmitting information using modulated magnetic fields.

FIG. 2 is a flowchart illustrating a method 200 for transmitting information using modulated magnetic fields. The operations of FIG. 2 can be embodied in hardware, such as an integrated circuit, software, firmware, or a combination thereof. In certain embodiments, the operations of FIG. 2 are performed, wholly or in part, by the transmitter 102 of FIG. 1.

With reference to FIG. 2, in operation 202, the transmitter 102 calibrates the magnetic field source 106. Calibration helps to ensure that the magnetic field source 106 is functioning properly and that modulated magnetic fields emitted by the magnetic field source 106 are detectable by the receiver 104. Operation 202 can be initiated when the transmitter 102 is first activated or prior to each transmission. Alternatively or additionally, calibration can be completed only due to a user input requesting calibration. The transmitter 102 can calibrate the magnetic field source 106 in any suitable manner. In one embodiment, the field controller 108 instructs the magnetic field source 106 to cycle through each of possible states a number of times. Such a method enables the receiver 104 to detect the different possible states in preparation of receiving a transmitted message.

In operation 204, the transmitter 102 receives information to be transmitted. In various embodiments, the information is received from a user input. For example, a user can type a message into a keyboard, or draw a graphical element on a touch screen. In other embodiments, information to be transmitted can be preprogrammed and provided to the field controller 108 or magnetic field source 106, for example, by pressing a button. The received information can be in any form capable of being encoded for transmission using modulated magnetic fields. For example, the received information can be analog or digital signals, text, graphical data, audio information, video information, or any other suitable information type. The types of information vary based on the configuration and use of the system. Examples of the system and data types are discussed in more detail below. In some embodiments, the received information includes computer program instructions which, when received by the receiver 104 are executed by a computer processor connected to the receiver 104.

In operation 206, the transmitter 102 encodes the received information. In various embodiments, the information can be encoded based on the type of magnetic field source 106 employed. For example, if the magnetic field source 106 has three possible states, then the received information can be encoded in a ternary representation. In other embodiments, the received information can be encoded in a binary representation. In another embodiment, the received information can be encoded to take advantage of increased bandwidth created by transmitting a portion of the encoded information with each of the orthogonal magnetic field sources 106 (e.g. three orthogonal tristate electromagnets each transmitting a portion of the information).

In operation 208, the field controller 108 modulates the magnetic field source 106 to transmit the encoded information. The field controller 108 can use any appropriate electrical, mechanical, or electromechanical means to modulate the magnetic field emitted by the magnetic field source 106. For example, in embodiments implemented with electromagnets as the magnetic field source 106, the field controller 108 controls the amount and direction of current flowing to the electromagnet to modulate the magnetic field. In embodiments implemented with permanent magnets, a manually operated or motorized shunt can be used to selectively block the magnetic field emitted by the permanent magnet, thus modulating the magnetic field. As the magnetic field is modulated, the strength and/or direction of the magnetic field are changed. These changes can be detected by other devices, such as the receiver 104. By modulating the magnetic field according to a particular encoding mechanism, information can be transmitted by the modulated magnetic field for later decoding and/or interpretation by a receiver, such as the receiver 104.

In some embodiments, once the encoded information has been transmitted by modulating the magnetic field emitted by the magnetic field source 106, the field controller 108 retransmits the encoded information as a check to ensure that it was received and interpreted correctly by the receiver 104. In other embodiments, the field controller 108 can modulate the magnetic field emitted by the magnetic field source 106 in a predetermined manner to signal to the receiver 104 that the transmission has completed and to proceed with decoding the received information.

Figure 3:
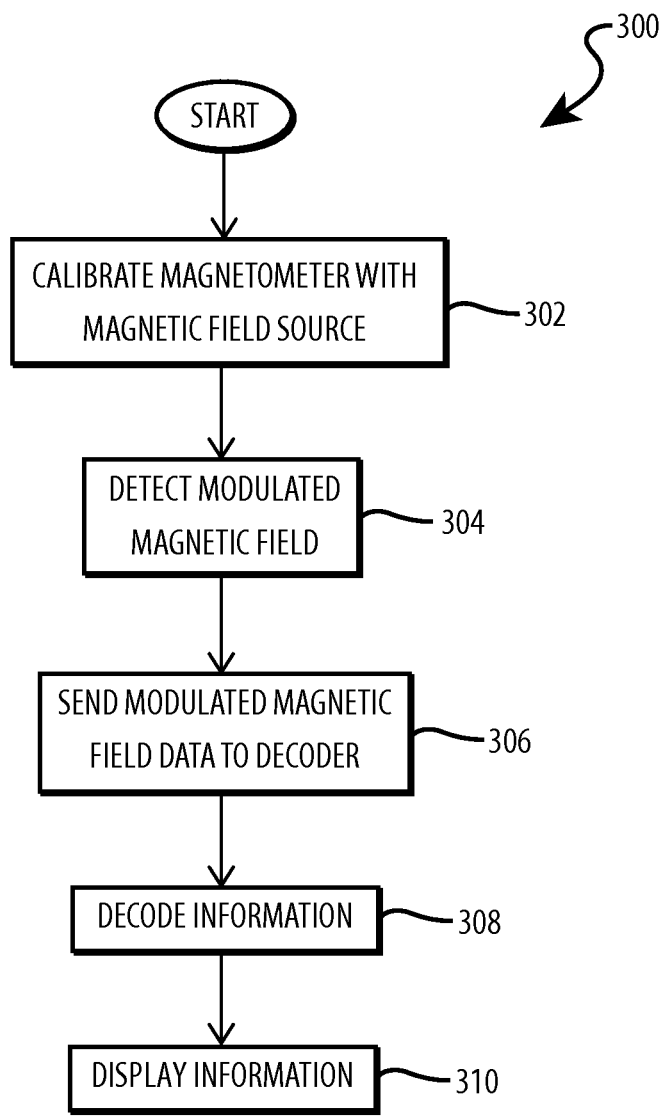
FIG. 3 is a flowchart illustrating a method for receiving information transmitted using modulated magnetic fields.

FIG. 3 is a flowchart illustrating a method 300 for depicting operations for receiving information transmitted using modulated magnetic fields. The operations of FIG. 3 can be embodied in hardware, such as an integrated circuit, software, firmware, or a combination thereof. In certain embodiments, the operations of FIG. 3 are performed, wholly or in part, by the receiver 104 of FIG. 1.

In operation 302, the receiver 104 optionally calibrates the magnetometer 110 with the magnetic field source 106. Similarly to the transmitter, the calibration operation can be selectively activated, activated prior to receiving information, when the receiver is first activated, or can be omitted. As discussed above with respect to FIG. 2, the magnetic field source 106 emits a series of magnetic field pulses, or cycles through each of its possible states a number of times. The magnetometer 110 can detect these calibration signals from the magnetic field source 106 and adjust any necessary parameters to realign to ensure that the magnetometer 110 is properly detecting the modulated magnetic fields. In some embodiments, calibration is done internal to the receiver 104. For example, the receiver 104 can include an internal magnetic field source for calibration.

In operation 304, the receiver 104 detects the encoded information in the form of a modulated magnetic field emitted by the magnetic field source 106. In various embodiments, the magnetometer 110 detects the magnetic fields and provides an analog or digital signal in response to the strength and/or orientation of the detected magnetic field. For example, in embodiments using Hall Effect sensors as the magnetometer 110, the Hall Effect sensors outputs a Hall Voltage, $V_H$, whose value is directly related to the strength of the magnetic field and whose sign is directly related to the direction of the magnetic field. In such embodiments, the Hall Voltage can be a positive voltage, negative voltage, or 0 voltage. In other embodiments, the receiver 104 detects only the orientation of the magnetic field. For example, in embodiments where the direction of the magnetic field is used to modulate the field (e.g., by changing the direction of current in an electromagnet), the receiver 104 can detect the changes in direction and produce electrical signals based on the detected changes. In one embodiment, the receiver 104 generates digital signals in binary or ternary based on the type of magnetic field source used.

In operation 306, the receiver 104 sends modulated magnetic field information, as detected by the magnetometer 110, to the decoder 112. The transmitted signals can be analog or digital. For example, in the embodiment using Hall Effect sensors, the Hall Voltage is an analog signal, and can be directly transmitted to an analog decoder. Alternatively, the hall voltages can be converted into digital signals and transmitted to a digital decoder. The modulated magnetic field data can be transmitted through a wired path (e.g., one or more system buses), wirelessly, or a combination thereof.

In operation 308, the receiver 104 decodes the received information. In various embodiments, the decoder 112 is a software program executing on one or more processing elements capable of receiving the encoded magnetic field data from the magnetometer 110, decoding the information, and producing an output based on the decoded information. For example, the decoder 112 can cause a text message, a graphic, such as a digital signature, or other output to appear on a display. In another example, the decoder 112 can cause an audible sound, vibration, or other haptic response to occur. The type of output depends on the receiver 104 and/or the device incorporating the receiver 104. In addition to visual, audible, and tactile outputs, the decoder 112 can also transmit or cause another device to transmit a signal or information to another computing device. For example, in an embodiment where the receiver 104 is incorporated into a smart phone, decoding the information causes the smart phone to transmit a signal to a wearable device, such as a smart watch. In certain embodiments, the decoder 112 can be preprogrammed to decode information encoded using a particular encoding method, such as ternary or binary. In other embodiments, the transmitter 102 communicates to the receiver 104 the type of encoding to be used during the calibration operation (see operation 202 above). In such embodiments, the decoder 112 can select the manner of decoding based on the received encoding information.

In operation 310, the receiver 104 causes the information to be displayed on a display device. In various embodiments, the receiver 104, or a component thereof, such as the decoder 112, can be connected to a display device, such as a touch screen, an light emitting diode (LED) display, a liquid crystal display (LCD), a plasma display, a retina display, an e-ink display, or any other type of display device. In some embodiments, the receiver 104 includes a processing element, which can be a component of the decoder 112 that decodes and/or interprets the magnetic field information and transmits instructions to the display device to display an output. For example, a magnetometer 110 in a smart phone can detect a modulated magnetic field emitted by a stylus or glove of a costumed character at a theme park and transmit the encoded information to an internal processing element in the smart phone that decodes the information and causes the signature of the character to appear on the display of the smart phone. Such an embodiment can ensure that different actors and actresses playing the characters have visually consistent signatures without extensive training and/or while wearing gloves or other dexterity limiting costume elements.

Figure 4A:
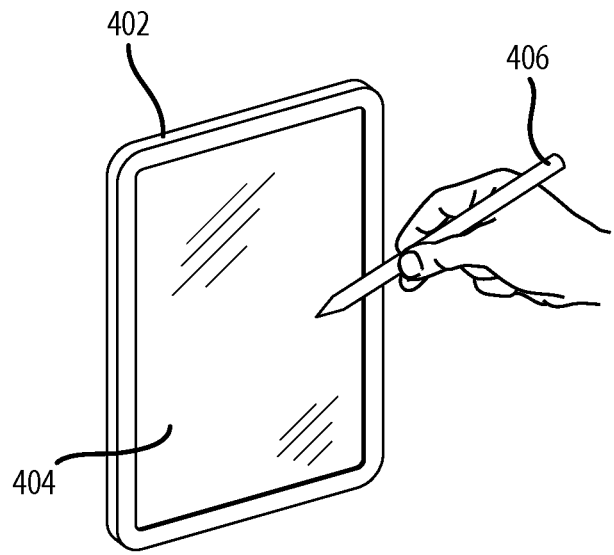
FIGS. 4A and 4B depict a first example of the information transmission of FIG. 1 including a mobile electronic device containing receiver and a stylus containing a transmitter.
Figure 4B:
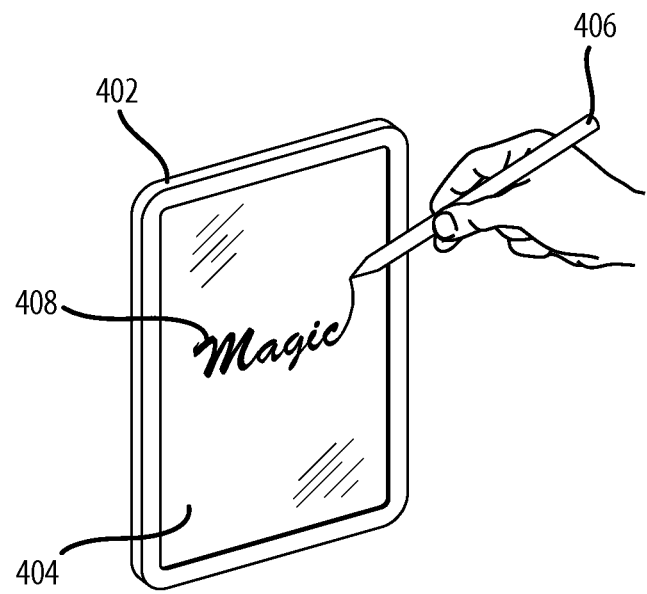

FIGS. 4A and 4B show a mobile electronic device 402 incorporating the receiver 104 and a stylus 406 incorporating the transmitter 102 for transmitting information using modulated magnetic fields, in accordance with an example embodiment. The mobile device 402 includes a display screen 404, such as a touch screen, an LED display, an LCD, a plasma display, a retina display, or any other type of display device. In some embodiments, the stylus 406 is placed at a distance, D, from the mobile device 402. In some embodiments, at the distance, D, the mobile device is unable to detect modulated magnetic fields emitted by the stylus 406 (e.g., because the signal is not strong enough). In other embodiments, the stylus 406 does not emit a modulated magnetic field until prompted to by a user. In this embodiment, the distance between the mobile device 402 and the stylus 406 prior to the prompt is irrelevant. If distance dependent, once the stylus crosses the D threshold, the transmitter can begin transmitting data to the receiver. If user activated, the stylus transmits data when activated by a user. Other activation options include receiving a signal from the receiver to begin transmission or the like.

When activated, the stylus 406 performs the method 200 (see FIG. 2). In various embodiments, the stylus 406 can transmit the information when it touches the mobile device 402, when it is near the mobile device (e.g., when a character waves a "magic wand" (the stylus 406) over the mobile device 402), or when activated by the user (e.g., by pressing a button). The stylus 406 can be held, for example, by a costumed character at a theme park and used to produce a digital reproduction of that character's signature consistently between actors or actresses playing the particular character.

In FIG. 4B, the stylus 406 is brought within a detectable range of the mobile device 402 and/or the user of the stylus 406 prompts the stylus (e.g., by pressing a button) to transmit modulated magnetic fields. The modulated magnetic fields are then produced by the transmitter and transmitted to the receiver.

During transmission of the modulated magnetic fields, the mobile device 402 performs the operations of the method 300 (see FIG. 3). The mobile device 402 detects the modulated magnetic field emitted by the stylus 406 via the magnetometer 110. Responsive to detecting and decoding the modulated magnetic field, the mobile device 402 causes a graphical element 408 to appear on the display 404 of the mobile device. The graphical element 408 can be, for example, a word, a picture, or a signature. In embodiments where the graphical element is a signature, the graphical element 408 can be consistent among different users holding the stylus. Traditionally, each actor playing a given character would have to learn to sign the name of the character in exactly the same way as the other actors to maintain consistency. With the advent of mobile electronic devices, such as smart phones, the device can replace traditional pen and paper, but the requirement of consistency is still present. Embodiments disclosed herein provide a versatile way of implementing a consistent electronic signature without having to implement heavily regulated systems such as BLE and NFC.

Figure 5:
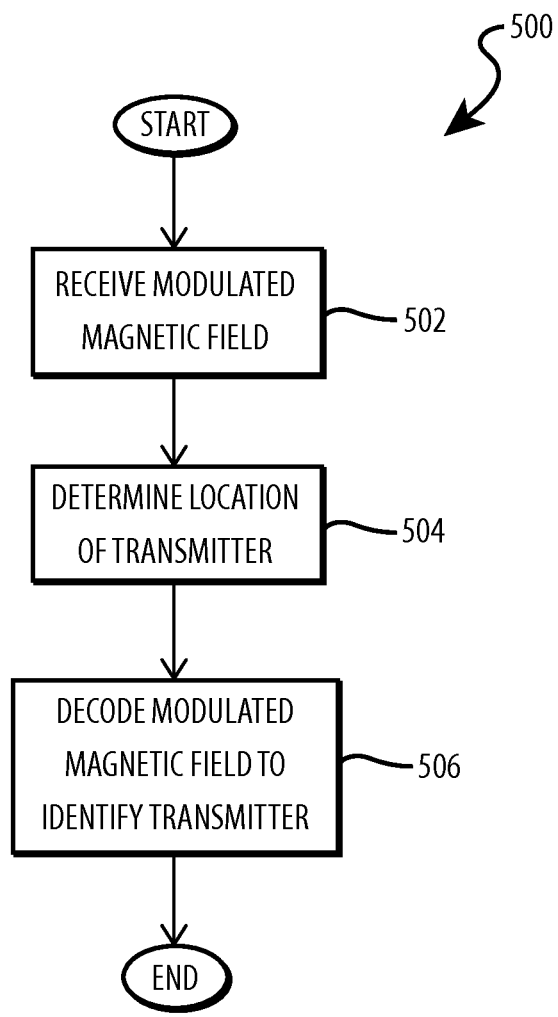
FIG. 5 is a flowchart illustrating a method for receiving location and identifying information using modulated magnetic fields.

FIG. 5 is a flowchart illustrating a method 500 for receiving location and identifying information using modulated magnetic fields. The operations of FIG. 5 can be embodied in hardware, such as an integrated circuit, software, firmware, or a combination thereof. In certain embodiments, the operations of FIG. 5 are embodied, wholly or in part, in the receiver 104 of FIG. 1. Transmitting location and identity information can be used, for example, in a board game to identify and locate playing pieces on the game board. In other embodiments, determining the identity using modulated magnetic fields can be used to research products in a store. For example, a user can place his or her smart phone near a magnetic field emitter associated with a product. The smart phone can identify the product based on the magnetic field and bring up related information about the product, such as pricing, ingredients, etc.

In operation 502, the receiver 104 detects a modulated magnetic field. The receiver 104 detects the modulated magnetic field using an internal or external magnetometer such as magnetometer 110. In operation 504, the receiver 104 determines the location of the transmitter 102. The location (e.g., the radial distance, polar angle, and/or the azimuthal angle), can be determined based on a known detector location, magnet with a magnetic field of known strength and orientation. For example, if the receiver 104 is in a known location, and the strength of the magnetic field is known, then the radial distance to the transmitter 102 can be calculated based on the measured magnetic flux at the receiver 104. In embodiments where the magnetometer is a Hall Effect sensor, then the Hall voltage, $V_H$, is proportional to the radial distance to the magnetic field source 106. In other embodiments, the magnetometer output is proportional to the distance to the magnetic field source 106 according to various relationships between the detected magnetic flux and the output voltage. The rate of change of magnetic flux as radial distance changes varies with the type of magnetic field source 106. The angular location can be calculated based on the direction of the detected magnetic field. If the orientation of the magnetic field source 106 is known, then the direction of the magnetic field detected at the receiver 104 is directly related to the angular location of the transmitter 102.

In operation 506, the receiver 104 decodes the modulated magnetic field to identify the transmitter 102. In various embodiments, multiple transmitters 102 are within a detectable range of the receiver 104. In such embodiments, in addition to determining the location of the transmitters 102, the receiver 104 can also identify each transmitter 102. For example, in a board game where moving playing pieces are the transmitters 102, each playing piece can modulate its magnetic field in a unique manner to identify the piece. In certain embodiments, a first playing piece transmits a single pulse, and a second playing piece transmits two magnetic field pulses. Accordingly, the receiver 104 can determine which piece is being located by the number of magnetic field pulses it detects. In such embodiments, the receiver 104 can track playing pieces as they move about the playing surface based on the identifying modulated magnetic field and the determined location. In other embodiments, a rotation of the magnetic field source 106 is detected using the magnetometer 110, and can be used to identify the magnetic field source 106.

Figure 6:
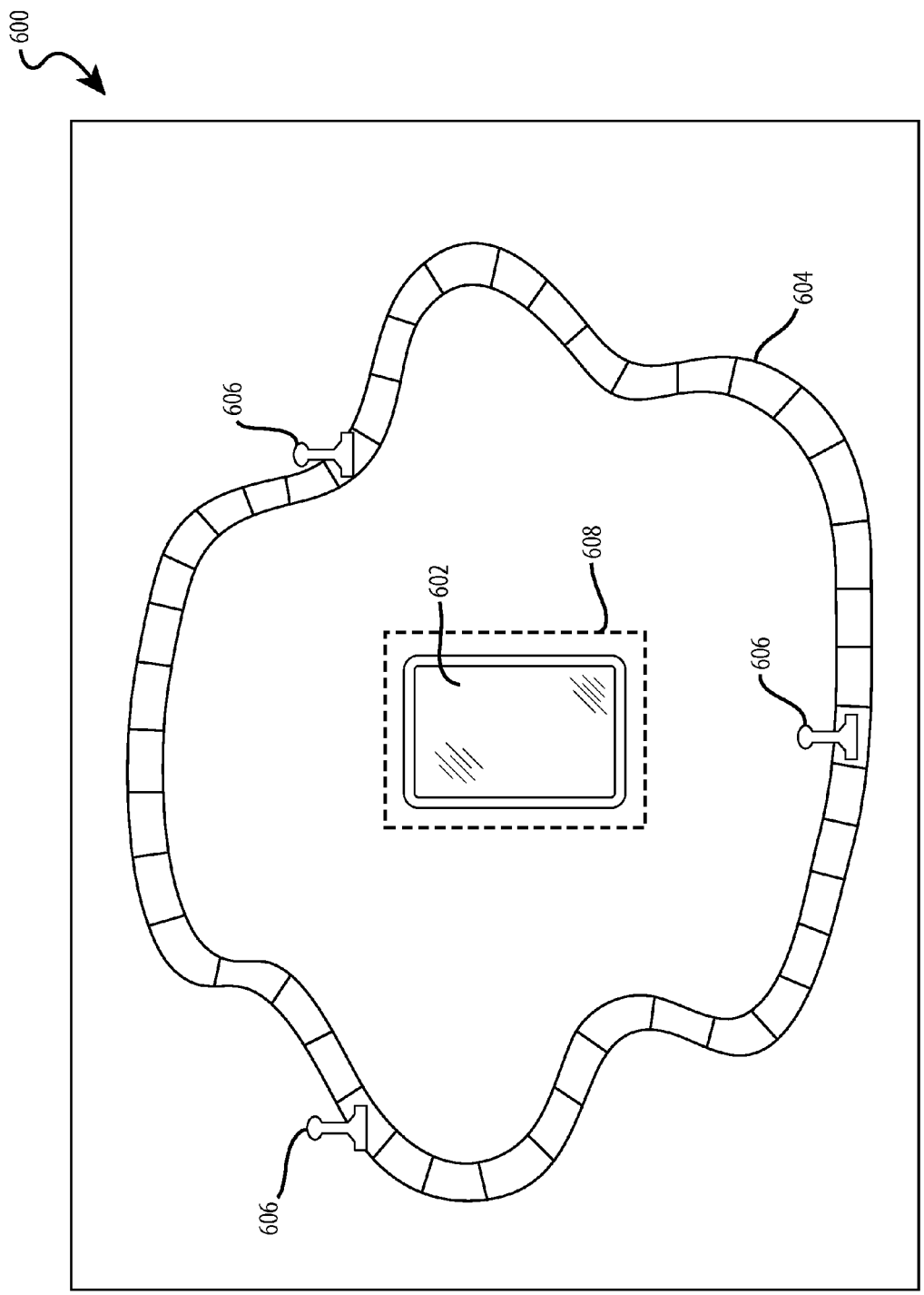
FIG. 6 depicts a second example of the information transmission of FIG. 1 including a board game having transmitting game pieces.

FIG. 6 depicts an example board game playing surface, generally designated 600, using modulated magnetic fields to transmit location and/or identity information. The playing surface 600 generally includes a computing device 602, a number of playing spaces 604 arranged around the computing device 602, and a number of playing pieces 606, positioned at various locations about the computing device 602. In the embodiment of FIG. 6, the computing device 602 acts as a receiver (e.g., receiver 104) for detecting and decoding modulated magnetic fields. Each of the playing pieces 606 can be a transmitter (e.g., transmitter 102) (or include a transmitter) for modulating magnetic fields. The ability of the computing device 602 to detect the locations and identify the playing pieces 606, as described above with respect to FIG. 5 allows the computing device 602 to determine the current state of the game, mediate rules, keep score, or even compete against other players. The location of the computing device 602 can be constrained to a specific location on the playing surface 600, for example, by an indicia 608 (e.g., an outline or a depression in the playing surface 600) to indicate where a user should place the computing device. The indicia 608 allow the device to be placed in a specific location and at a specific orientation so that the device's location is known. Because the location of the computing device 602 is known, the computing device 602 does not need to calibrate itself in order to determine the location of the playing pieces 606 relative to the computing device 602 and the playing surface 600.

Each playing piece 606 can be selectively activated by, for example, pressing a button on one of the playing pieces 606. In various embodiments, each playing piece defaults to an "off" setting in which the magnetic field of the playing piece is blocked or deactivated, depending on the type of magnetic field source used in the playing piece 606. At each turn, a player is instructed to press a button on the playing piece 606 to transmit a modulated magnetic field so the computing device 602 can determine the location and/or identity of the playing piece as described above with respect to FIG. 5. In other embodiments, the playing pieces 606 are manually arranged so that all pieces except for one have their magnetic poles arranged in a first direction (e.g., the x-direction) while one piece is positioned with its magnetic pole oriented at an angle (e.g., orthogonal) to the others (e.g., the y-direction). In certain embodiments, the computing device 602 detects the rate at which the playing pieces 606 move from a first location to a second location or the time elapsed between the piece moving from the first location to the second location. In another embodiment, the computing device detects the first playing piece 606 to be activated (e.g., which player "buzzed in" first).

Figure 6A:
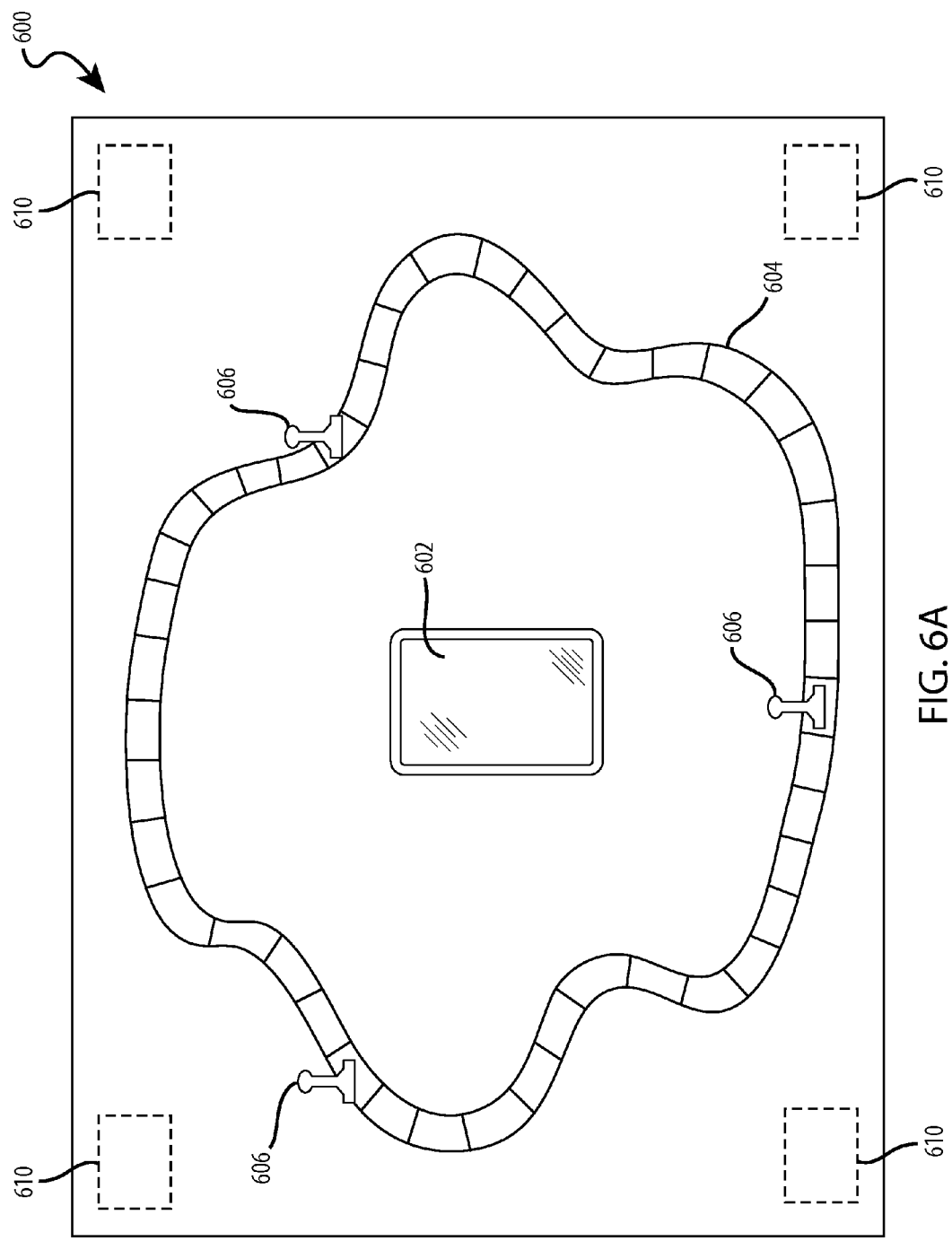
FIG. 6A depicts a third example of the information transmission of FIG. 1 including a board game having calibration magnets.

In other examples, the indicia 608 can be omitted and the device can be placed anywhere on the playing surface 600. In these embodiments, a calibration process is used so that the computing device 602 can orient itself (e.g., determine its location and orientation on the playing surface 600). FIG. 6A depicts the board game playing surface 600 of FIG. 6 with a plurality of calibration magnets 610 for determining the location of the computing device 602. In various embodiments, the calibration magnets 610 are integrated with the playing surface 600 (e.g., formed within the board). In other embodiments, the calibration magnets 610 can be placed at specific locations on the playing surface 600. The computing device 602 determines the location of the computing device 602 based on the strengths and orientations of the calibration magnets 610. For example, where the magnetic fields produced by the calibration magnets 610 have a known strength and orientation, the computing device 602 can determine its orientation based on the net strength and orientation of the detected magnetic field. In other embodiments, the calibration magnets 610 of known strength and orientation are sequentially activated and detected by the computing device 602, which can calculate its location based on the strength and orientation of each detected calibration magnet 610.

The calibration magnets 610 can be removed from the playing surface 600 after the location of the computing device 602 is determined. Once the location of the computing device 602 is determined, the computing device 602 can determine the locations of the playing pieces 606 based on the detected field strength and/or field orientation as the computing device 610 determined its location via the calibration process and thus can determine the location(s) of the playing pieces 606 relative to itself and the playing surface 600. By integrating the calibration magnets 610 into the playing surface 600, the computing device 602 does not need to be in a predetermined location in order to determine the locations and/or identities of the playing pieces 606, but rather can be placed in any location, as long as a calibration or location determination step is used.

Figure 7:
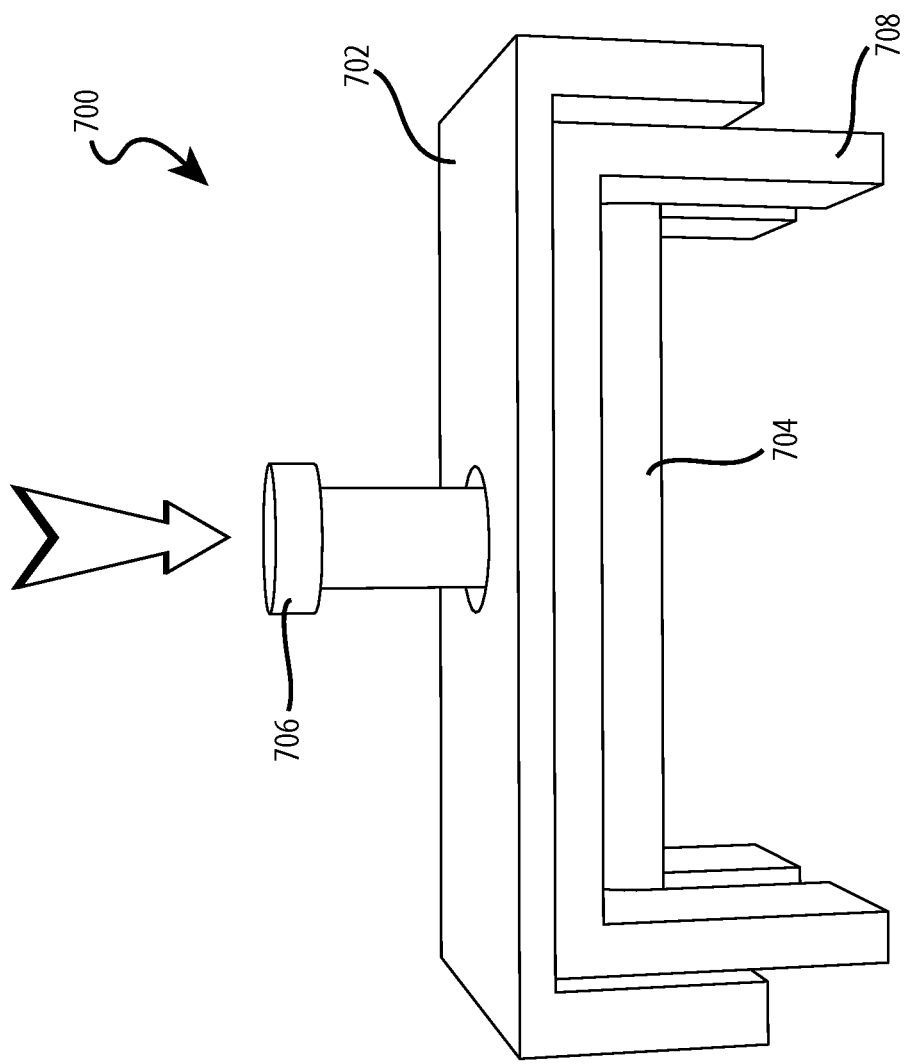
FIG. 7 is an example mechanical shunt for selectively modulating a magnetic field for use in the system of FIG. 1.

FIG. 7 is an example transmitter, generally designated 700, for selectively modulating a magnetic field. The transmitter 700 includes a shunt 702, a bar magnet 704, a plunger 706, and guide rails 708. The shunt 702 can be any material capable of blocking a magnetic field, such as a ferromagnetic metal. In some embodiments, the shunt 702 is made of soft iron, nickel, or cobalt, or an alloy thereof. The bar magnet 704 can be any material that produces a magnetic field, such as a permanent magnet, an electromagnet, or any other suitable magnetically hard material. The plunger 706 can be any mechanical device that can selectively move the bar magnet 704 or the shunt 702 to produce a magnetic field beyond the shunt 702. The guide rails 708 can be plastic or other magnetically inert material that can guide the bar magnet 704 responsive to a force applied to the plunger 706. In the embodiment of FIG. 7, the bar magnet 704 is biased to an "off position' where the magnetic field is blocked by the shunt 702. The shunt 702 includes walls positioned close to the poles of the bar magnet 704 to ensure that a magnetic field emitted by the bar magnet 704 is sufficiently blocked. When a force is applied to the plunger 706, the bar magnet 704 descends beyond the shunt 702 and allow for a magnetic field to be produced beyond the transmitter 700. Applying a force to the plunger 706 sequentially can modulate the magnetic field allowing for identification of the transmitter 700. In other embodiments, a single force applied to the plunger 706 results in the bar magnet 704 passing multiple shunts 702 which modulate the emitted magnetic field. The shunt 702 allows the magnetic fields of a permanent magnetic to be modulated in a similar manner as an electromagnet, but without requiring a power source. When used with the game system described above, the shunt 702 enables the game pieces operate without a power source (e.g., batteries), while still allowing the magnetic field to be modulated. Similar types of mechanical or the shunting elements can be used with other permanent magnets in other transmission examples to allow low or zero power transmission devices.

FIGS. 8A and 8B depict a fourth example of the information transfer of FIG. 1 including a mock radio receiver, generally designated 800, having a transmitting dial. The radio receiver 800 includes a radio housing 802, a transmitting dial 804, and a computing device 806. The radio housing 802 can be aesthetically designed as desired and in some instances resemble an antique or vintage radio, such as styles that were popular during the 1930's and 1940's. The radio housing can include a seat 812 configured to receive and support the computing device 806. In various embodiments, the transmitting dial 804 is integrated into the radio housing 802 and configured to be rotatable about an axis. The transmitting dial 804 can include or be coupled to one or more magnetic field sources such that when the transmitting dial is turned, a modulated magnetic field is produced by the coupled magnetic field sources. The computing device 806 can include software for mimicking the display of an antique or vintage radio. For example, the computing device 806 can display a radio dial face 808 and a dial needle 810, which can indicate the currently selected station. When placed in the seat 812, the computing device detects a magnetic field transmitted by the transmitting dial 804. In response to detecting a modulated magnetic field produced in response to rotating the transmitting dial 804, the an output is varied (e.g., the dial needle 810 moves along the radio dial face 808). Additionally, the computing device 806 can change an audio output (e.g., change radio stations) in response to detecting a modulated magnetic field. For example, a user may place a smart phone (i.e., computing device 806) in the seat 812. The smart phone may detect a magnetic field produced by the transmitting dial 804, and in response cause the display of the smart phone to depict a radio dial face 808 and output an audio signal (e.g., music). When the user rotates the transmitting dial 804, the display of the smart phone and the audio output may be adjusted as though the user were changing the radio station of the mock radio receiver 800.

FIG. 8B is an example transmitting dial 804 for use with the radio receiver 800. The transmitting dial 804 includes a dial handle 814 and a magnetic field source 812 (e.g., a permanent bar magnet) coupled to the dial handle 814. In the depicted embodiment, a user can adjust the transmitting dial 804 by turning the dial handle 814, and as the dial 804 is turned, the magnetic field source 812 rotates therewith. As magnetic field source 812 rotates, the orientation of the magnetic field changes, creating a modulated magnetic field. The computing device 806 detects the change in magnetic field orientation with an internal magnetometer and adjusts the display output and audio output accordingly. Although a one to one ratio of rotation between the dial handle 814 and the magnetic field source 812 is described above, those skilled in the art will appreciate that other ratios of rotation or other magnetic field sources can be used. For example, rotating the transmitting dial 804 changes the resistance of a variable resistor or the capacitance of a variable capacitor, which is coupled to an electromagnet to produce a magnetic field with modulated field strength. By transmitting information using modulated magnetic fields, a user can interact with a simulated vintage radio, for example in an amusement park, providing a more engaging and enjoyable user experience. Those skilled in the art will appreciate that other types of magnetic field variations can be applicable to a variety of scenarios without deviating from the scope of this disclosure. For example, a rotatable magnetic field source can be coupled to a steering wheel where turning the steering wheel produces a turn in a driving simulation displayed on a computing device.

Figure 9:
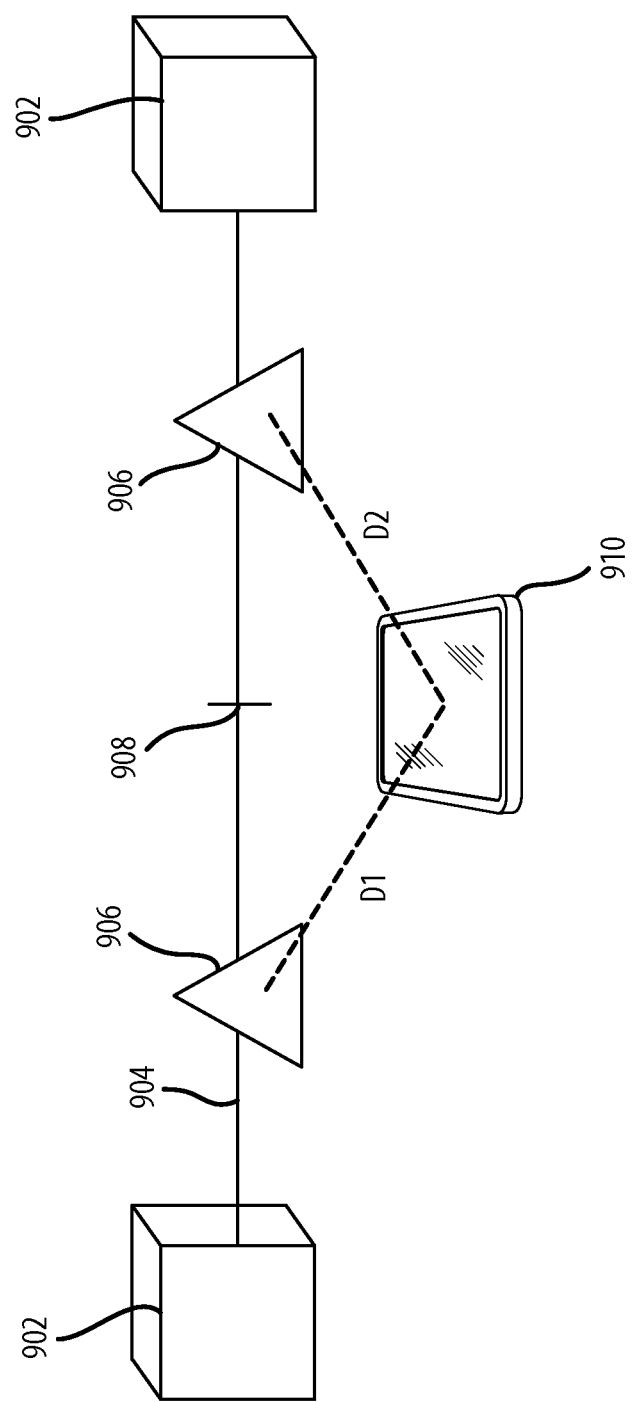
FIG. 9 is depicts a fifth example of the information transfer of FIG. 1 including a game with transmitting game pieces.

FIG. 9 is depicts a fifth example of the information transfer of FIG. 1 including an interactive game with transmitting game pieces. The embodiment of FIG. 9 includes anchors 902, a rope 904 extending between the anchors 902, a number of playing pieces 906, and a computing device 910. The anchors 902 can be any object capable of suspending the rope 904 between them (e.g., handles, posts, blocks, etc.). The anchors 902 can be sculpted or decorated objects in keeping with a theme of the game (e.g., a particular historical period, a particular genre, etc.) In other embodiments, the anchors 902 can be omitted. The rope 904 can be any of a rope, chain, thread, or the like, or any combination thereof. The playing pieces 906 can be any objects capable of being moved, automatically or manually, along the rope 906 and including magnetic field sources for creating modulated magnetic fields. Similar to the anchors, the playing pieces 906 can be sculpted or molded into a shape in keeping with a theme of the game (e.g., a particular historical period, a particular genre, etc.). For example, the playing pieces 906 can be molded to resemble persons engaged in a tug-of war where the rope 904 is the rope for the tug of war. The playing pieces 906 include have internal or external magnetic field sources for creating modulated magnetic fields. In some embodiments, the playing pieces have magnetic field sources of known strength and orientation. In other embodiments, the strengths and orientations of the magnetic field sources are determined based on a user action, such as removing a mechanical shunt as described above with respect to FIG. 7. In general, any magnetic field source capable of modulating a magnetic field to convey location and/or identity information can be used with the playing pieces 906.

To play the game, the computing device 910 is positioned at a known location with respect to the anchors 902 and or the rope 904. For example, the computing device 910 can be placed at a center point 908 along the rope 904. The computing device 910 includes an internal magnetometer for detecting modulated magnetic fields produced by the playing pieces 906. For example, the playing pieces 906 can include magnetic field sources of known strength and orientation. The computing device 910 detects the magnetic fields produced by one or both of the playing pieces, and determine the location and/or identity of the playing pieces 906. The computing device can determine the location of a first playing piece 906 and determine that the playing piece is a distance, D1, from the computing device 910. Similarly, the computing device can determine the location of a second playing piece 906 and determine that the second playing piece 906 is a second distance, D2, from the computing device 910. Based on the distances between the playing pieces 906 and the computing device 910, the computing device 910 can change an output (e.g., display, sounds, vibration, etc.) to indicate the current status of the game. In some embodiments, the computing device 910 keeps score based on the distances between the playing pieces 906 and the computing device 910. For example, if the distance D2 is greater than the distance D1, the computing device 910 can determine that the playing piece 906 at distance D2 is currently winning the game.

Figure 10:
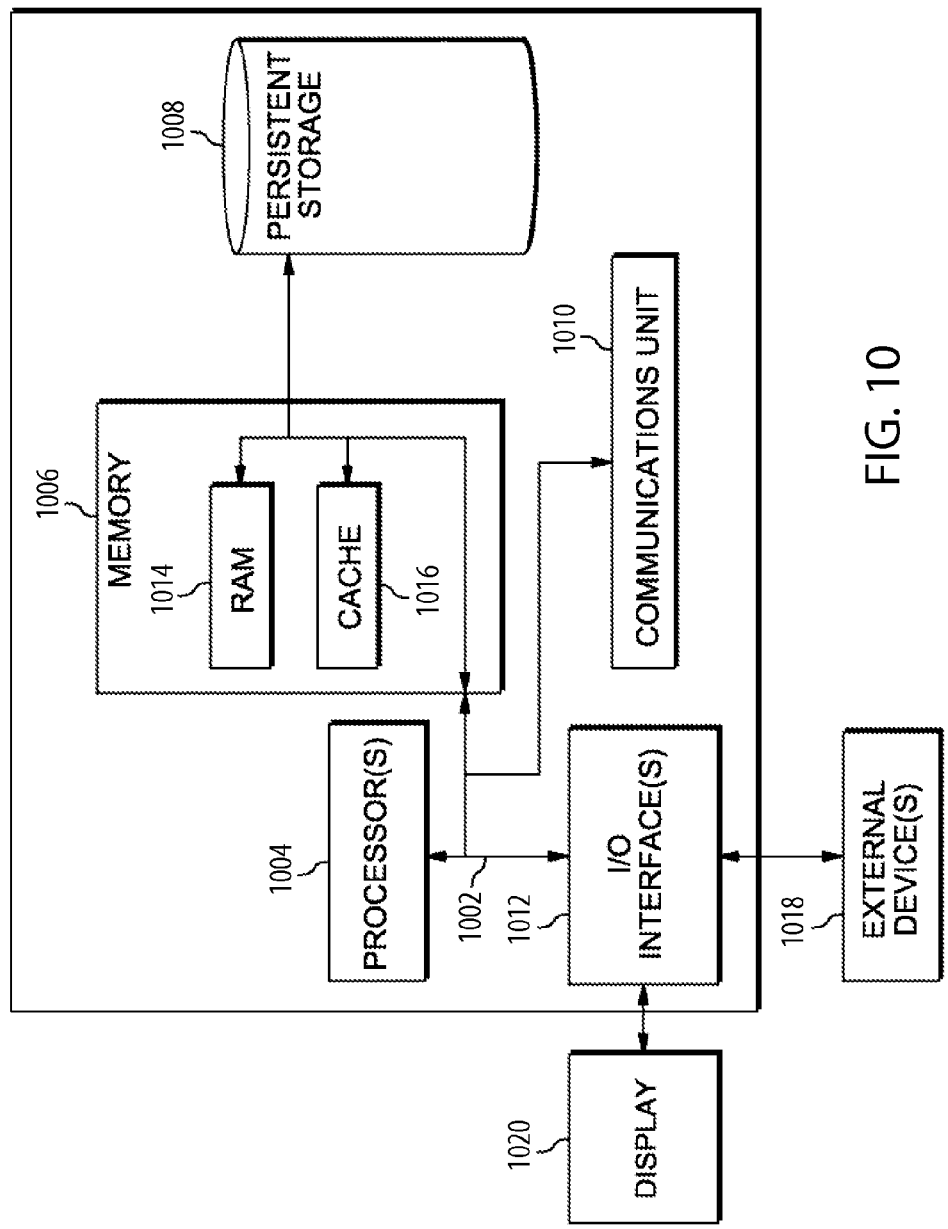
FIG. 10 is a simplified block diagram of a transmitter and/or receiver of the system of FIG. 1.

FIG. 10 depicts a block diagram of components of the transmitter 102, receiver 104, and/or devices including the transmitter 102 or receiver 104, in accordance with an illustrative embodiment. It should be appreciated that FIG. 10 provides only an illustration of one implementation and does not imply any limitations with regard to the environments in which different embodiments can be implemented. Many modifications to the depicted environment can be made.

The transmitter 102 includes a communications fabric 1002, which provides communications between a computer processor(s) 1004, a memory 1006, a persistent storage 1008, a communications unit 1010, and an input/output (I/O) interface(s) 1012. The communications fabric 1002 can be implemented with any architecture designed for passing data and/or control information between processors (such as microprocessors, communications and network processors, etc.), system memory, peripheral devices, and any other hardware components within a system. For example, the communications fabric 1002 can be implemented with one or more buses.

The memory 1006 and the persistent storage 1008 are computer-readable storage media. In this embodiment, the memory 1006 includes random access memory (RAM) 1014 and cache memory 1016. In general, the memory 1006 can include any suitable volatile or non-volatile computer-readable storage media.

The field controller 108 is stored in the persistent storage 1008 for execution by one or more of the respective computer processors 1004 via one or more memories of the memory 1006. In this embodiment, the persistent storage 1008 includes a magnetic hard disk drive. Alternatively, or in addition to a magnetic hard disk drive, the persistent storage 1008 can include a solid state hard drive, a semiconductor storage device, read-only memory (ROM), erasable programmable read-only memory (EPROM), flash memory, or any other computer-readable storage media that is capable of storing program instructions or digital information.

The media used by the persistent storage 1008 can also be removable. For example, a removable hard drive can be used for the persistent storage 1008. Other examples include optical and magnetic disks, thumb drives, and smart cards that are inserted into a drive for transfer onto another computer-readable storage medium that is also part of the persistent storage 1008.

The communications unit 1010, in these examples, provides for communications with other data processing systems or devices. In these examples, the communications unit 1010 includes one or more network interface cards and one or more near field communication devices. The communications unit 1010 provides communications through the use of either or both physical and wireless communications links. Computer programs and processes can be downloaded to the persistent storage 1008 through the communications unit 1010.

The I/O interface(s) 1012 allows for input and output of data with other devices that can be connected to the receiver. For example, the I/O interface 1012 can provide a connection to external devices 1018 such as a keyboard, keypad, a touch screen, a camera, a magnetometer, and/or some other suitable input device. The external devices 1018 can also include portable computer-readable storage media such as, for example, thumb drives, portable optical or magnetic disks, and memory cards. Software and data used to practice various embodiments can be stored on such portable computer-readable storage media and can be loaded onto the persistent storage 1008 via the I/O interface(s) 1012. The I/O interface(s) 1012 can also connect to a display 1020.

The display 1020 provides a mechanism to display data to a user and may be, for example, an embedded display screen or touch screen.

The components described herein are identified based upon the application for which they are implemented in a specific embodiment. However, it should be appreciated that any particular component nomenclature herein is used merely for convenience, and thus the scope of the subject matter disclosed should not be limited to use solely in any specific application identified and/or implied by such nomenclature.

The flowcharts and block diagrams in the Figures illustrate the architecture, functionality, and operation of possible implementations of systems and methods according to various embodiments. In this regard, each block in the flowchart or block diagrams can represent a module, segment, or portion of code or circuit which comprises one or more executable instructions for implementing the specified logical function(s). It should also be noted that, in some alternative implementations, the functions noted in the block can occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for transmitting information with a magnetic field source comprising:
   receiving information to be transmitted;
   encoding the information comprising a graphical element;
   selectively modulating a magnetic field based on the encoded information; and
   touching a magnetic field transmitter to a magnetic field receiver, wherein the magnetic field is selectively modulated responsive to touching the magnetic field transmitter to the magnetic field receiver;
   transmitting the information to the magnetic field receiver, including the graphical element, via the modulated magnetic field; and
   displaying the graphical element on a display in communication with the magnetic field receiver.

2. The method of claim 1, further comprising:
   calibrating the magnetic field source with one or more receivers.

3. The method of claim 1, wherein the magnetic field source can be configured to emit the magnetic field in a plurality of states.

4. The method of claim 3, wherein the plurality of states comprises at least two of a magnetic field having a first polarity, no magnetic field, and a magnetic field having a second polarity.

5. The method of claim 3, wherein selectively modulating the magnetic field comprises transitioning the magnetic field between the plurality of states in a predetermined manner based on the encoded information.

6. The method of claim 1, wherein encoding the information comprises converting the received information into a format transmittable by the modulated magnetic field.

7. A method comprising:
   receiving a modulated magnetic field from a first magnetic field source having a known strength, wherein the first magnetic field source is rotatable such that rotation of the first magnetic field source generates the modulated magnetic field;
   determining one or more characteristics of the modulated magnetic field;
   determining a location of the first magnetic field source based on the determined characteristics of the magnetic field;
   identifying the first magnetic field source based on the modulated magnetic field;
   changing an output of a display device based on the location and identity of the magnetic field source, wherein the change of the output is proportional to a rotation amount of the first magnetic field source.

8. The method of claim 7, wherein the first magnetic field source is modulated by an actuatable mechanical shunt.

9. The method of claim 8, wherein
   the first magnetic field source is rotatable; and
   the actuatable mechanical shunt is configured to substantially block the magnetic field and the actuatable mechanical shunt has a plurality of gaps formed therethrough at predetermined locations such that the modulated magnetic field is produced responsive to the magnetic field source rotating.

10. A method for controlling a simulated radio comprising:
    displaying a radio dial face in a first configuration on a computing device configured to detect modulated magnetic fields;
    modulating a magnetic field responsive to a user input, wherein the user input comprises rotating a radio dial;
    detecting the modulated magnetic field with the computing device; and
    modifying the radio dial face to a second configuration in response to detecting the modulated magnetic field with the computing device, wherein the modification comprises a linear movement along an axis, wherein the linear movement is proportional to the rotation of the radio dial by the user.

11. The method of claim 10, further comprising:
modifying an audio output of the computing device from a first audio output to a second audio output in response to detecting the modulated magnetic field.

12. The method of claim 10, wherein rotating the radio dial modulates the magnetic field by changing an orientation of the magnetic field.

* * * * *